June 18, 1935.  R. O. CHAFFEE  2,005,672

SELF TAPPING SCREW

Filed July 8, 1933

Inventor:
Raymond O. Chaffee.
by Walter S. Jones
Atty.

Patented June 18, 1935

2,005,672

UNITED STATES PATENT OFFICE 2,005,672

SELF-TAPPING SCREW

Raymond O. Chaffee, Belmont, Mass., assignor to United-Carr Fastener Corporation, Cambridge, Mass., a corporation of Massachusetts Application July 8, 1933, Serial No. 679,544

1 Claim. (Cl. 85—46)

My invention aims to provide improvements in screws of the self-tapping type particularly adapted for use in metal.

In the drawing which illustrates a preferred embodiment of my invention:—

The particular embodiment of my invention selected for illustration by the annexed drawing comprises a so-called self-tapping screw preferably provided with hardened thread means adapted to cut its own way into metal structures in such a manner as to be rigidly held in position.

Figure 3:
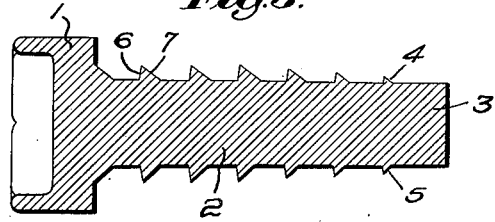
Fig. 3 is a section taken on the line 3—3 of Fig. 2 to show the detail construction of the screw.

The particular screw illustrated by the drawing has a hexagonal head 1, a body portion 2 connected at one end to the head 1 and a pilot portion 3 at the other end of the body portion 2. The body portion 2 is preferably provided with two threads 4 and 5 thereby providing a double threaded shank on the screw. Each screw thread is of a special shape and may be termed a ratchet type because it is provided with a rear face 6 substantially at a right angle to the axis of the body of the screw and a front face 7 substantially at a forty-five degree angle to the back face. With this type of thread the leading face enters the metal more readily than the leading face of the conventional type of screw thread and the rear face prevents, to a larger degree, "backing out" of the thread than is the case with the ordinary type of thread heretofore used. Attention is also directed to the fact that the threads 4 and 5 extend the entire length of the body portion 2 and adjacent to the pilot 3 taper from the pitch diameter of the threads to the root diameter in a gradual slope, as clearly illustrated in Fig. 3. The thread is also full-formed throughout its entire length.

Figure 1:
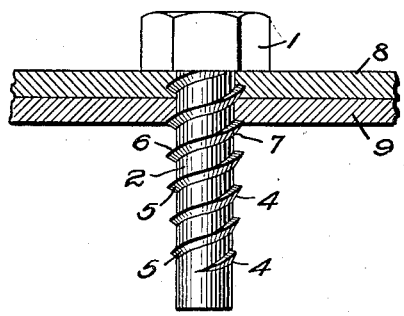
Figure 1 is a side elevational view of a screw as it appears when securing two relatively thin metal plates, which are shown in cross-section.
Figure 2:
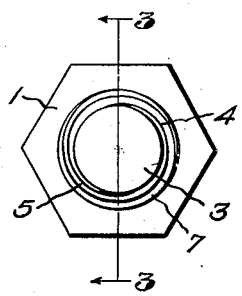
Fig. 2 is an end elevation of the screw.

Since my improved devices are particularly useful in connection with metal work and particularly for securing sheet metal parts together, I will describe the use thereof for securing two relatively thin sheet metal parts 8 and 9 together, as illustrated by Fig. 1. These sheet metal parts 8 and 9 have preformed apertures therethrough the size of the pilot portion 3. Thereafter the pilot portion 3 is entered into the apertures in the parts 8 and 9 and rotated thereby causing the threads 4 and 5 to cut their own ways into the metal of the parts 8 and 9.

By using the double thread I secure a balanced entrance of the screw through the parts 8 and 9 because the threads are on opposed ends of a diameter through the body 2 thereby providing simultaneous cutting edges as the screw is rotated. Furthermore, the actual contact of the threads 4 and 5 in engagement with the material is approximately seven per cent greater than when a single thread is used with a result that the frictional resistance to loosening of the screw is also increased. Since the threads are tapered for a considerable distance, there is no difficulty in entering the double thread during the initial operation of securing the screw in position.

By using threads of the so-called ratchet type they are stronger than the ordinary standard type of thread because the forty-five degree angle sets up a greater resistance to shearing strains than the ordinary thirty degree angle of the usual type thread. Furthermore, the increased angle makes for an easier entrance of the threads into the material while the relatively abrupt angle of the rear face of each thread sets up a greater resistance to loosening of the screw after it has been turned into position. The net result of the ratchet thread is a greater holding power over the ordinary type of thread.

By providing a full-formed thread from beginning to end of the body portion 2 I provide a smooth, chisel-shaped cutting edge even throughout the tapered portion thereby eliminating any tendency of a jamming action particularly during the initial entering period of the threads into the material.

I prefer to harden the threads 4 and 5 in any suitable manner so that they will cut their own way into metal parts without disfiguring the threads.

My improved device is relatively simple in construction, durable and adapted to be used for several types of work.

While I have illustrated and described a preferred embodiment of my invention, I do not wish to be limited thereby, because the scope of my invention is best defined by the following claim.

I claim:—

A self-tapping screw for securing a plurality of sheet metal members together, said screw having an enlarged head, a threaded shank portion and an unthreaded pilot end, the shank being formed with double ratchet type threads extending from the head to the pilot end, the leading face of each thread being substantially at a forty-five degree angle to the shank throughout its length and the rear face thereof being substantially perpendicular to the axis of the shank, the root diameter of the thread being substantialy equal to the diameter of the shank and the threads being hardened and full formed and of tapering depth diminishing in depth toward and merging with the pilot end, the double threads of the shank portion providing opposed cutting edges to facilitate balanced entering in an aperture and progressive and concentric tapping into the sheet metal members, the perpendicular faces of the thread acting to hold the metal members securely against the head of the screw.

RAYMOND O. CHAFFEE.